US006403669B1

(12) United States Patent
Camberlin et al.

(10) Patent No.: US 6,403,669 B1
(45) Date of Patent: Jun. 11, 2002

(54) ALVEOLAR MATERIALS THAT CONTAIN AT LEAST ONE THERMOPLASTIC POLYMER, AT LEAST ONE MODIFIED EPOXIDE RESIN AND AT LEAST ONE PORE-FORMING AGENT

(75) Inventors: Yves Camberlin, Caluire; Jacky Grenier, Vignieu; Anthony Bonnet, Passins; Jean-Pierre Pascault, Villeurbanne; Henri Sautereau, Vaulx en Velin, all of (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/440,289

(22) Filed: Nov. 15, 1999

(30) Foreign Application Priority Data

Nov. 13, 1998 (FR) .............................. 98 14320

(51) Int. Cl.⁷ ................................................ C08T 9/00
(52) U.S. Cl. ...................................... 521/178; 521/135
(58) Field of Search .................................. 521/135, 128

(56) References Cited

U.S. PATENT DOCUMENTS 4,828,771 A   5/1989  Kishima et al. .............. 264/41
5,274,006 A * 12/1993 Kagoshima et al. ........ 521/135

FOREIGN PATENT DOCUMENTS

EP          0 480 677           4/1992

OTHER PUBLICATIONS

Patent Abstract of Japan—Pub. No. 55155703 Published Apr. 12, 1980; Applicant—Sumitomo Bakelite Co. Ltd.; Inventor—Izumi Yasunobu; Title—Polysulfone–Base Separating Membrane And Its Production.

English Abstract of Japan—XP–002110342.

* cited by examiner

*Primary Examiner*—Morton Foelak
(74) *Attorney, Agent, or Firm*—Millen, White, Zelano & Branigan, P.C.

(57) ABSTRACT

Alveolar materials that comprise at least one thermoplastic polymer that is selected from the group that is formed by polyetherimides, polysulfones and polyphenylene-ethers, at least one epoxide resin that is modified by at least one aromatic polyamine and at least one pore-forming agent or the degradation product(s) of said pore-forming agent, their syntheses and their uses.

17 Claims, No Drawings

ALVEOLAR MATERIALS THAT CONTAIN AT LEAST ONE THERMOPLASTIC POLYMER, AT LEAST ONE MODIFIED EPOXIDE RESIN AND AT LEAST ONE PORE-FORMING AGENT

FIELD OF THE INVENTION

The invention relates to thermostable alveolar materials, a process for synthesis of these materials and the uses of these materials, in particular in the field of petroleum drilling and in all of the fields where it is desirable to have alveolar materials that have good fire resistance and that procure good sound and thermal insulation. These alveolar materials are sometimes referred to as foam materials, cellular materials or expanded materials.

BACKGROUND OF THE INVENTION

A large number of documents describe rigid or flexible cellular materials that have good thermal resistance and fire resistance properties, as well as various methods for production of these products. One of the oldest production techniques of alveolar materials with a polyimide base, described, i.a., in U.S. Pat. No. 3,249,561 and U.S. Pat. No. 3,883,452 in the name of Du Pont de Nemours, consists in producing a polyimide foam from a polyamide-acid solution in the presence of an agent that decomposes during heating, which makes possible the formation of polyimide by releasing a gas such as carbon dioxide or carbon monoxide. This process is relatively difficult to use since the starting polymer is in dilute solution in a polar organic solvent, and it is necessary to control simultaneously the evaporation of the solvent, the imidation reaction and the formation of the cellular structure. With the thermoplastic polyimides such as the polyetherimides, sold by the General Electric Plastics Company under the trade name ULTEM®, the addition of a porophoric agent (sometimes also referred to as pore-forming) has also been used to create the cellular structure, as is described in, for example, U.S. Pat. No. 4,532,263 in the name of Mobil Oil. Another method, described in, for example, U.S. Pat. No. 4,007,922 in the name of the Upjohn Company, consists in mixing this type of polyimide with hollow microspheres.

A method that was the subject of a very large number of publications consists in synthesizing the polyimides by reacting an aromatic bis(ortho-acid-ester), instead of an aromatic dianhydride, on a diamine or on a mixture of several diamines. This reaction provides, by heating to a high temperature, polyimides with release of a water molecule and an alcohol molecule for each imide cycle that is formed. These two volatile compounds are used as porophoric agents in the production of the cellular materials of polyimides. Since the quantity of volatile products released is relatively large, the reaction is generally conducted in two stages. A first partial polycondensation stage is carried out in solution to form imide oligomers, which are isolated in powder form by precipitation in a non-solvent medium. This meltable power that is optionally mixed with various additives is placed in a mold and heated above its melting point. The expansion of the material is brought about by the continuation of the polycondensation reaction.

This production technique has been used with numerous monomer mixtures. It is possible to cite, by way of illustrative example of this method, U.S. Pat. No. 3,502,712, in which is described the reaction of a diester of benzophenone-tetracarboxylic-3,3',4,4'acid with metaphenylenediamine. The use of a diamine mixture, for forming more flexible polyimide foams, that comprises aromatic diamines and flexible diamines such as acrylonitrile-butadiene-diamines is described in, for example, U.S. Pat. No. 4,456,862 or the diamino-poly(dimethylsiloxanes) in U.S. Pat. No. 4,535,099.

The various methods that are set forth above make it possible to produce thermostable polyimide foams that have very varied characteristics. They can be rigid, semi-flexible or flexible according to the nature of the monomers or polymers that are used to prepare them. They generally have open pores, but in some cases, the pores can be closed, and they cover a quite wide range of density and resistance to compression.

In a general way, however, most of these production processes require a strict monitoring of the synthesis conditions of polymers and the operating protocol of these polymers to obtain reproducible results.

The problems that are encountered for the preparation of the alveolar polyimide materials are also found again for the preparation of most of the thermostable, thermoplastic alveolar materials that are obtained from thermoplastic polymers that have a high glass transition temperature. In particular, the obtaining of alveolar materials by raising the temperature, which is a method that is a priori very simple, is made delicate and its application is difficult because the operating temperature of the initial polymer for obtaining the mixture that makes possible the subsequent obtaining of the foam material is high (often 300 to 400° C.) and often much higher than the triggering temperature of the porophoric agent (often 150 to 250° C.).

SUMMARY OF THE INVENTION

This invention relates to the alveolar materials that maintain the main properties of the thermostable alveolar materials of the prior art, but whose use is made less difficult by the use of modified thermostable polymer mixtures whose operating temperatures for obtaining alveolar materials, in particular by increasing temperature, are on the order of the triggering temperature of the porophoric agent or relatively close to this triggering threshold.

DETAILED DESCRIPTION OF THE INVENTION

The alveolar materials of this invention are defined as being characterized in that they comprise at least one thermostable, thermoplastic polymer, at least one epoxide resin that is modified by at least one aromatic polyamine and at least one pore-forming agent or the degradation product(s) of said pore-forming agent.

Within the meaning of this description, any thermoplastic polymer that has adequate mechanical properties to be able to be used also at a temperature that is greater than 150° C. is referred to by the term thermostable, thermoplastic polymer. This definition is the one that is commonly accepted by ones skilled in the art and incorporated into, for example, the basic work that constitutes the encyclopedia Ulmann's Encyclopedia of Industrial Chemistry (see Volume A21, page 449) of the fifth edition published in 1992).

The alveolar materials of this invention contain at least one thermostable, thermoplastic polymer, preferably amorphous, most often selected from the group that is formed by the polyetherimides (PEI), the polysulfones (PSU), in particular the polyethersulfones (PES) and the polyphenylene-sulfones (PPS), and the polyphenylene-ethers (PPE). These alveolar materials contain at least one epoxide resin that is modified by at least one aromatic polyamine, whereby said resin is usually formed from at least one polyepoxide that contains in its molecule at least two epoxide groups and at least one aromatic, preferably occupied polyamine that most often comprises in its molecule at least two primary amino groups, whereby the molar ratio of the polyamine to the epoxide is most often such that from 1.6 to 2.6 epoxide groups correspond to each amino group. Most often, the aromatic polyamine that is used comprises at least one alkyl substituent that has 1 to 12 carbon atoms that are located in alpha-position of one of the amino groups.

The polyetherimides that are used for producing the alveolar materials according to this invention are most often selected from the group of polyetherimides (PEI) that are sold on the market and in particular from among the products that are marketed by the General Electric Plastics Company under the name ULTEM®. The term polysulfone can produce ambiguity. Actually, the first polymer of commercial significance whose base group contains a sulfone group—$SO_2$—is the polymer that is marketed by the AMOCO Company under the name UDEL®. This particular polysulfone thus often receives the generic name of polysulfone. Within the meaning of the description, the term polysulfone covers the generic meaning and does not have only the limiting meaning of the UDEL®-type polysulfone. The polysulfones that are used for producing the alveolar materials according to this invention are most often selected from the group that is formed by the aromatic polysulfones and, preferably, the polysulfones such as UDEL®, but also the polyethersulfones such as RADEL A®, marketed by the AMOCO Company, and the polyphenylenesulfones such as RADEL R®, also marketed by the AMOCO Company. The polyphenylene-ethers (PPE) that are used for producing the alveolar materials according to this invention are most often the polyphenylene-ethers that are marketed by the general Electric Plastics Company under the trademark NORYL®. These polymers are often also named poly(phenylene-oxides) or, in abbreviated form, PPO.

The epoxide resin that is used within the scope of this invention is most often selected from the group that is formed by the following commercial resins: the diglycidylether resin of bis-phenol-A or bis-phenol-F, the bis-phenol formol resin, the phenol-novolak resin, the cycloaliphatic resins, the tri- or tetrafunctional resins, the resins that are formed from triglycidylether-isocyanurate and/or triglycidylether-cyanurate and/or triglycidyl-cyanurate and/or triglycidyl-isocyanurate or the mixtures of at least two of these resins. The epoxide resins that are obtained from epoxide compounds that are cited in U.S. Pat. No. 4,921,047 can also be used within the scope of this invention.

Among the aromatic polyamines that are used within the scope of this invention for modifying the epoxide resins, it is possible to consider a first series of aromatic amines that comprise a singe aromatic core, such as, for example, 3,5-diethyl-2,4-diaminotoluene, 3,5-diethyl-2,6-diaminotoluene and the mixtures of these two isomers. Most often, a mixture of these two isomers is used that is generally named DETDA.

In a second series of amines that are used within the scope of this invention, the amines that comprise at least two aromatic cores are considered, whereby these two aromatic cores are generally connected to one another by a bivalent, linear or branched radical that contains hydrocarbon and that comprises 1 to 18 carbon atoms. These two aromatic cores are either connected by a bivalent alkyl group or connected to one another by a bivalent, linear or branched radical that contains hydrocarbon and that has 6 to 18 carbon atoms and that comprises an aromatic core.

The aromatic polyamine can also comprise at least one substituent that is selected from the group that is formed by fluorine, iodine, bromine and chlorine. It preferably comprises at least two alkyl substituents that are located on both sides of an amino group.

In the case where the two aromatic cores are connected by a bivalent alkylene radical, this radical will preferably be a methylidene group that is not substituted or is substituted by at least one radical that is selected from among the alkyl radicals and the haloalkyl radicals that have 1 to 3 carbon atoms. For example, this alkylene radical will be selected from the group that is formed by the methylidene group, the isopropylidene group, the haloisopropylidene groups, such as the hexafluoroisopropylidene group. In this case, the amine is preferably selected from the group that is formed by:

4,4'-Methylene-bis(2,6-dimethylaniline) or M-DMA;

4,4'-methylene-bis(2-isopropyl-6-methyl-aniline) or M-MIPA;

4,4'-methylene-bis(2,6-diethylaniline) or M-DEA;

4,4'-methylene-bis(2,6-diisopropylaniline) or M-DIPA; and 4,4'-methylene-bis(3-chloro-2,6-diethylaniline) or M-CDEA.

Among these amines, 4,4'-methylene-bis(2,6-diethylaniline) and 4,4'-methylene-bis(3-chloro-2,6-diethylaniline) have a special advantage.

In the case where the amine comprises two aromatic cores that are connected to one another by a substituted or non-substituted bivalent radical that contains hydrocarbon and that has 6 to 18 carbon atoms and that comprises an aromatic core, it will preferably be selected from the group that is formed by:

4,4'-(Phenylene-diisopropyl)-bis(2,6-dimethyl-aniline);

4,4'-(phenylene-diisopropyl)-bis(2,6-diethyl-aniline);

4,4'-(phenylene-diisopropyl)-bis(2,6-dipropyl-aniline);

4,4'-(phenylene-diisopropyl)-bis(2,6-diisopropyl-aniline);

4,4'-(phenylene-diisopropyl)-bis(2,6-dimethyl-3-chloro-aniline);

4,4'-(phenylene-diisopropyl)-bis(2,6-diethyl-3-chloro-aniline);

4,4'-(phenylene-diisopropyl)-bis(2,6-dipropyl-3-chloro-aniline);

4,4'-(phenylene-diisopropyl)-bis(2,6-diisopropyl-3-chloro-aniline);

3,3'-(phenylene-diisopropyl)-bis(2,6-dimethyl-aniline);

3,3'-(phenylene-diisopropyl)-bis(2,6-diethyl-aniline);

3,3'-(phenylene-diisopropyl)-bis(2,6-dipropyl-aniline);

3,3'-(phenylene-diisopropyl)-bis(2,6-dimethyl-3-chloro-aniline);

3,3'-(phenylene-diisopropyl)-bis(2,6-diethyl-3-chloro-aniline);

3,3'-(phenylene-diisopropyl)-bis(2,6-dipropyl-3-chloro-aniline);

3,3'-(phenylene-diisopropyl)-bis(2,6-diisopropylaniline); and 3,3'-(phenylene-diisopropyl)-bis(2,6-diisopropyl-3-chloro-aniline).

The preferred aromatic polyamines are selected because of their low reactivity and also because of their non-toxic nature.

The pore-forming agent that is used to form the alveolar materials of this invention is selected from the group that is formed by the chemical pore-forming agents and the physical pore-forming agents. These pore-forming agents are compounds that are conventionally used to form expanded materials that are well known to ones skilled in the art. In the alveolar material that is formed, either the pore-forming agent is found just as is, for example when it is a gas or a compound that forms a gas by raising the temperature and thus causes the formation of cavities, or degradation product(s) of said pore-forming agent when a compound is used that by raising the temperature will be transformed by releasing a gas that thus causes the formation of cavities in the polymer composition. As examples of physical pore-forming agents that are used for the preparation of alveolar materials of this invention, it is possible to cite liquid or gaseous compounds such as nitrogen, carbon dioxide, light hydrocarbons such as methane, ethane, propane, butane, pentane, cyclopentane, hexane or isoheptane, chlorofluorohydrocarbons such as chlorofluorocarbons (CFC) such as freon, or similar hydrogenated compounds such as hydrochlorofluorocarbons (HCFC). As examples of chemical pore-forming agents that are used for the preparation of alveolar materials of this invention, it is possible to cite solid compounds that decompose by forming a gas at a temperature that is specific to each pore-forming agent that is being considered. Chemical pore-forming agents whose decomposition temperature is from about 150 to 250° C. and frequently from about 180 to 250° C. are used most often. These chemical pore-forming agents are compounds that are well known to ones who are skilled in the art. As nonlimiting examples, organic compounds such as azo compounds and in particular azo-dicarbonamide (1,1'-azobisformamide) compounds, N-nitroso compounds, hydrazides, for example p-toluene sulfonyl hydrazide or oxybis(benzene sulfonyl hydrazide, paratoluene sulfonyl-semicarbazide, or inorganic compounds such as sodium borohydride, ammonium salts of organic acids or mineral acids, alkaline or alkaline-earth metal bicarbonates, mixtures of several compounds that by reaction with respect to one another release a gaseous compound, for example mixtures of carbonates and acids (alkaline or alkaline-earth metal bicarbonate with citric acid) are used.

The thermostable, thermoplastic polymer preferably represents about 15 to 98%, and even more preferably 35 to 80%, by mass relative to the total mass of the thermoplastic polymer(s) and of the epoxide resin that is modified by at least one aromatic polyamine. The epoxide resin that is modified by at least one aromatic polyamine represents about 2 to 85%, and even more preferably, about 20 to 65%, by mass relative to the total mass of the thermoplastic polymer(s) and the epoxide resin. The content of pore-forming agent or degradation product(s) of said pore-forming agent is usually from about 0.1 to 5% by mass and most often from about 0.5 to 2.5% by mass relative to the total mass of the alveolar material.

The alveolar materials according to this invention can contain a single thermostable, thermoplastic polymer or a mixture of several thermostable, thermoplastic polymers, or else at least one thermostable, thermoplastic polymer and at least one other polymer. As examples of said polymers, it is possible to cite the polyether ketones that are preferably aromatic (for example, the products that are sold by the ICI Company such as poly(oxy-1,4-phenylenecarbonyl-1,4-phenylene), PEK in abbreviated form, or poly(oxy-1,4-phenyleneoxy-1,4-phenylenecarbonyl-1,4-phenylene), PEEK in abbreviated form, or the products that are sold by the Du Pont, Amoco, Hoechst or BASF Companies, such as, for example, those that are mentioned in Ullmann's Encyclopedia of Industrial Chemistry Vol. A21, page 458). It is also possible to cite as other polymers the arylene polysulfides, such as, for example, phenylene polysulfide (PPS) that is sold by the Phillips Petroleum Company under the trademark RYTON®. As other polymers, it is also possible to cite polycarbonates (for example, the product that is sold by the General Electric Plastics Company under the trademark LEXAN®) and the thermoplastic elastomers that most often make it possible to improve the mechanical properties of the alveolar materials of this invention, such as, for example, impact resistance and flexibility resistance. Said elastomers are linear or branched, grafted or non-grafted, sequenced or non-sequenced. They can comprise reactive functions, for example such as anhydride, acid, epoxide, alcohol or others. The addition of thermoplastic elastomers makes it possible to increase the flexibility of the expanded products that are obtained and to improve their impact resistance. As nonlimiting examples, the thermoplastic elastomers that are used most often are styrene-ethylene-butene-styrene, SEBS in abbreviated form; styrene-ethylene-propylene-styrene, SEPS in abbreviated form; styrene-butadiene-styrene, SBS in abbreviated form; styrene-isoprene-styrene, SIS in abbreviated form, or polyurethanes. As examples of alveolar materials according to this invention that contain several thermostable, thermoplastic polymers and an elastomer, it is possible to cite a material that contains PEI, PPE, a modified epoxide resin and SEBS in a quantity that represents about 14% by mass relative to the total mass of the thermostable, thermoplastic polymers and the modified epoxide resin.

When the alveolar materials according to the invention contain, in addition to at least one thermostable, thermoplastic polymer, at least one epoxide resin that is modified by at least one aromatic polyamine, and at least one pore-forming agent or the degradation product(s) of said pore-forming agent, at least one other polymer, this (or these) other polymer(s) usually represent(s) about 1 to 50% by mass relative to the total mass of the thermostable, thermoplastic polymers and the epoxide resin that is modified by at least one aromatic polyamine. The thermoplastic elastomer content is usually less than about 20% by mass, however, relative to the total mass of the thermoplastic polymers and the epoxide resin that is modified by at least one aromatic polyamine.

The alveolar materials according to this invention can also contain active catalysts in the reaction between the epoxide resins and the aromatic occupied polyamines. The active catalysts that are used most often are imidazoles, tertiary amines and complexes with a trifluorinated boron base. It is also possible to add additives that are most often selected from the group that is formed by antioxidants, pigments, adhesion promoters, heat stabilizers, radiation and more particularly ultraviolet radiation stabilizers, flame retardants, demolding agents, foam nucleation agents, dispersion agents, lubricants, dyes, plasticizers, flame-retarded products, bridging agents, surfactants, reinforcement agents, organic, mineral or organometallic reinforcement feedstocks, mineral or organic reinforcement fibers, such as, for example, glass, carbon or boron fibers. The alveolar materials according to this invention can also contain organic or mineral feedstocks such as, for example, talc, silica or titanium dioxide. Some alveolar materials according to this invention, usually called syntactic foams by ones that are skilled in the art, usually contain hollow or less dense bodies that have participated in the creation of the pores of said material. These hollow bodies can be, for example, microspheres of glass or of another material or cenospheres.

The alveolar materials of this invention are prepared by standard methods for preparation of foam materials that are well known to ones skilled in the art. These alveolar materials are obtained, for example, by formation of a composition that contains various components of the alveolar material that it is desired to prepare by bringing into contact these components and in particular at least one thermostable, thermoplastic polymer, at least one epoxide resin that is modified by at least one aromatic polyamine, with at least one physical and/or chemical foaming agent, followed by the formation of the alveolar material under standard conditions of formation of said alveolar material from said composition. Most often, the alveolar materials of this invention are prepared by using at least one chemical-type pore-forming agent. Most often, a single chemical pore-forming agent is used.

The preparation of the alveolar materials according to the invention can comprise the formation of a mixture that contains the various components that reenter the composition of the alveolar material within a mixer or an extruder. Most often, a double-screw extruder of the CLEXTRAL Company is used, whereby this extruder comprises several levels of introducing various components that are to be mixed.

As an example, the mixture of various components can be obtained by the introduction of at least one thermostable, thermoplastic polymer and at least one chemical pore-forming agent, as well as optional additives and feedstocks and optionally at least one other polymer such as, for example, a thermoplastic elastomer, in an input zone of the extruder, located at the opposite end of the extrudate recovery zone. In this input zone, the temperature is usually from about 100° C. The different products are then entrained into a second zone where the temperature is usually from about 150° C. and in which is introduced at least one epoxide resin with at least one aromatic polyamine. These products are entrained by the double-screw extruder, whereby the temperature inside this extruder generally gradually increases to reach a temperature that is less than the chemical decomposition temperature of the chemical pore-forming agent at the extruder outlet. In the case where the foam materials are obtained from several chemical pore-forming agents of different natures, said temperature at the outlet of the extruder is preferably less than the lowest chemical decomposition temperature of the various pore-forming agents.

It is also possible to introduce separately each component of the mixture into the extruder by different input zones or by a single input zone.

The epoxide resins and the aromatic polyamines are preferably mixed to form the modified epoxide resins that are used for the production of the alveolar materials according to this invention. Most often, the modified epoxide resins are heated to a temperature that is usually between about 50 and 120° C. and most often between 50 and 90° C. before their introduction into a double-screw extruder.

The pore-forming agent(s), in particular of chemical type, can be mixed with the powdered product that is obtained by grinding the extrudate that contain the thermostable, thermoplastic polymer, the modified epoxide resin and optionally feedstocks, additives and other polymers as mentioned above, to obtain a powder from which it is possible to form the alveolar material. It is also possible to mix the pore-forming agent(s), in particular of chemical type, with the thermostable, thermoplastic polymer(s) and then to introduce this mixture into the extruder. In the latter case, the mixture of the thermostable, thermoplastic polymer(s) and the pore-forming agent(s) is generally introduced at the top of the extruder, and then the modified epoxide resin(s) is (are) introduced downstream in the direction of advance of the mixture toward the outlet of the extruder.

Since the flow rate of the modified epoxide resins is usually constant, said resins are introduced, for example, with a gear pump. In contrast, most often, thermostable, thermoplastic polymer(s) and (a) pore-forming agent(s) is (are) introduced with an apparatus that meters by weight, for the purpose of obtaining mixtures with different ratios of modified epoxide resins/ thermostable, thermoplastic polymers.

The mixture that is obtained at the outlet of the extruder is homogeneous. It is most often cooled with air, generally granulated, then ground, to obtain a powder. Said powder is then most often pressed in a mold at a temperature that is generally between about 180 and 260° C., for a period of about 0.5 to 5 hours (h), most often from about 1 to 3 hours. The product can then be annealed at a temperature that is usually between about 190 and 270° C. and often from about 200 to 260° C., for a period of about 0.5 to 15 hours, often from about 1 to 10 hours. This annealing is preferably carried out with a drying oven. Plates of foam material of various densities according to the quantity of powder that is introduced into the mold are obtained. The expansion can also be obtained continuously, for example by passage into a cooling fixture at the outlet of the extruder. In this case, it is possible to work while operating at temperatures that are greater than or equal to the triggering temperature of the pore-forming agent.

The foam materials of the invention can be used for thermal and sound insulation, for example in the field of construction, housing, transportation, petroleum drilling, hydrocarbon transport and refining. They can also be used for the fight against fires, in particular by decreasing the emission of toxic gases and/or smoke, and by decreasing the combustibility.

This invention also relates to the compositions that contain at least one thermostable, thermoplastic polymer, at least one epoxide resin that is modified by at least one aromatic polyamine and at least one pore-forming agent from which it is possible to produce the alveolar materials that are described above. All of the various possibilities that are described above for the alveolar materials also apply to compositions from which these alveolar materials are produced.

The complete description of all applications, all patents and publications that are cited above and below, and of corresponding French Application 98/14.320, filed on Nov. 13, 1998, is included by reference in this description.

The following examples illustrate the invention without limiting its scope.

EXAMPLE 1

This example relates to the preparation of an alveolar material that contains a polyetherimide and an epoxide resin that is modified by mixing powder and adding the chemical pore-forming agent, then formation of the foam material by heating and annealing. A two-screw extruder CLEXTRAL that is sold under reference BC21, whose length to diameter ratio is 28, is used. The screws have a diameter of 25 millimeters (mm), and the extruder is equipped with a die whose diameter is 4 mm.

The polyetherimide that is used is marketed by the General Electric Plastics Company under reference ULTEM 1000. Its mean molecular weight in number is 26,000 grams/mol (g/mol), and its grain size is 300 micrometers (μm). Before its introduction into the extruder, the polyetherimide is dried in a drying oven at 120° C. for 2 hours (h).

The modified epoxide resin comprises 8.016 kilograms (kg) of diglycidylether of bis-phenol-A (DGEBA), marketed under reference LY556 by the Ciba-Geigy Company and 3.984 kg of 4,4'-methylene-bis(3-chloro-2,6-diethylaniline) (MCDEA), marketed by the Lonza Company.

Before its introduction into the extruder, the modified epoxide resin is heated to 80° C. while being stirred. The reaction progress of this mixture was measured by size exclusion chromatography. The reactivity is very low: 5 hours at 60° C. leads to a reaction progress of 1%.

The modified epoxide resin is introduced into the extruder with a gear pump and a constant flow rate of 1 kilogram/hour (kg/h). The polyetherimide is introduced with an apparatus that meters by weight at a flow rate of 1.5 kg/h to obtain a mixture that contains 40% by mass of modified epoxide resin, whereby the percentage of modified epoxide resin is calculated relative to the total mass of the mixture that is formed by polyetherimide and modified epoxide resin.

The polyetherimide ULTEM 1000 is introduced into an input zone of the extruder that is located at the end opposite to the recovery zone of the extrudate. In this input zone, the temperature is 100° C. This product is entrained in a second zone of the extruder in which the temperature is 150° C. and in which the modified epoxide resin that is described above is introduced. ULTEM 1000 is introduced with an apparatus that meters by weight at the flow rate of 1.5 kg/h, and the modified epoxide resin is introduced by a gear pump at the constant flow rate of 1 kg/h.

These compounds are entrained by the rotary extrudate to the outlet of the extrudate. The temperature inside the extruder gradually increases to reach 170° C. at the outlet of the extruder.

At the outlet of the extruder, a homogeneous mixture that contains 40% by mass of modified epoxide resin, which is cooled with air, granulated, then ground, to obtain a powder, is obtained.

Azodicarbonamide is added to the powder as a pore-forming agent in a quantity such that it represents a content by mass of 1% of the total mass of the resulting composition. The chemical decomposition temperature of said pore-forming agent is 190° C. 70 g of this composition is introduced into a mold of 255 cm³. The mold is hermetically closed and then brought to 200° C. for 2 hours. Annealing is then performed by bringing the mold to 220° C. for two hours. After cooling and opening the mold, a plate of alveolar material of a density that is equal to 0.3 is recovered.

Measurements of glass transition temperature, thermal conductivity and stress at the flow threshold have been carried out on these plates of alveolar material.

The thermo-mechanical properties of the alveolar material have been determined by a DMTA (Dynamic Mechanical Thermal Analysis) analysis by simple fit at a frequency of 1 Hz. Glass transition temperature (Tg) that is measured is 195° C. (beginning of the glass transition).

The measurement of the stress at the flow threshold was carried out on a (2/M)-type pulling machine of the MTS company that is equipped with an inverter device to make said machine operate in the compression mode. This machine comprises a measuring head of 10 kiloNewton (kN) and a crosspiece that operates at a speed of 1 millimeter/minute (mm/min). The measurements are carried out on five samples that each have the shape of a straight prism according to Standard ISO 844. The mean value of the stress at the flow threshold is 7 MPa for the alveolar material that is obtained above and that has a density of 0.3.

The insulating properties of the foam have been determined by the measurement of the thermal conductivity according to Standard ASTM C518, with a RAPID-K apparatus of the Dynatec Technology Company. The measured thermal conductivity is 0.074 watt/meter.Kelvin (W/m.K) for the alveolar material that is obtained above and that has a density of 0.3.

EXAMPLE 2

This example relates to the preparation of a foam material that contains the same components as the one that is formed in Example 1 in the identical quantity. In this embodiment, the azodicarbonamide that is used as a pore-forming agent in a quantity such that it represents a content by mass of 1% of the total mass of the final alveolar material is mixed with polyetherimide before its introduction into the extruder. At the outlet of the extruder, a homogenous mixture that contains 40% by mass of modified epoxide resin, polyetherimide and pore-forming agent is thus obtained. This mixture is cooled with air, granulated, then ground, to obtain a powder that is then used to form the alveolar material by following the procedure that is described in Example 1. The values of compression resistance, thermal conductivity and glass transition that are measured as in Example 1 are identical to those that are found for the alveolar material that is prepared in Example 1.

EXAMPLE 3

This example describes the preparation of a foam material that contains as thermostable, thermoplastic polymer the polyphenylenesulfone that is marketed by the AMOCO Company under the name RADEL R® that has a grain size of 300 micrometers, the modified epoxide resin is identical to the one that is described in Example 1 and the pore-forming agent is also the one that is used in Example 1. The preparation conditions and the quantities of products that are employed are the same as in Example 1. The quantity of powder that is introduced into the mold is 90 g. After cooling and opening the mold, a plate of alveolar material that has a density equal to 0.4 is recovered.

The thermo-mechanical properties of the alveolar material that is obtained have been determined by a DMTA (Dynamic Mechanical Thermal Analysis) analysis by simple fit at a frequency of 1 Hz. Glass transition temperature (Tg) that is measured is 204° C. (beginning of the glass transition).

The measurement of the stress at the flow threshold was carried out on a (2/M)-type pulling machine of the MTS Company that is equipped with an inverter device to make said machine operate in the compression mode. This machine comprises a measuring head of 10 kiloNewton (kN) and a crosspiece that operates at a speed of 1 millimeter/minute (mm/min) The measurements are carried out on five samples that each have the shape of a straight prism according to Standard ISO 844. The mean value of the stress at the flow threshold is 10 MPa for the alveolar material that is obtained above and that has a density of 0.4.

The insulating properties of the foam have been determined by the measurement of the thermal conductivity according to Standard ASTM C518, with a RAPID-K apparatus of the Dynatec Technology Company. The measured thermal conductivity is 0.086 watt/meter.Kelvin (W/m.K) for the alveolar material that is obtained above and that has a density of 0.4.

EXAMPLE 4

The different stages of Example 3 are reproduced identically but by using paratoluenesulfonyl-semicarbazide as a chemical pore-forming agent, whereby the chemical decomposition temperature of said pore-forming agent is 230° C. 90 g of this composition is introduced into a mold of 255 cm$^3$. The mold is closed hermetically, then brought to 240° C. for 2 hours. Annealing is then initiated by bringing the mold to 260° C. for two hours. After cooling and opening the mold, a plate of alveolar material of a density that is equal to 0.4 is recovered. The glass transition temperature, the thermal conductivity and the stress at the flow threshold are identical to those that are found on the foam material that is obtained according to Example 3.

EXAMPLE 5

This example describes the preparation of a foam material that as thermostable, thermoplastic polymer contains the polyphenylene-ether that is marketed by the General Electric Plastics Company under reference PPE 800 of molecular weight in a number that is close to 12,000 g/mol and that has a grain size of 300 micrometers. The modified epoxide resin is identical to the one that is described in Example 1, and the pore-forming agent is also the one that is used in Example 1. The conditions of preparation and the quantities of products that are used are the same as in Example 1. The quantity of powder that is introduced into the mold is 90 g. After cooling and opening the mold, a plate of alveolar material that has a density that is equal to 0.4 is recovered.

The thermo-mechanical properties of the alveolar material that is obtained have been determined by a DMTA (Dynamic Mechanical Thermal Analysis) analysis by simple fit at a frequency of 1 Hz. Glass transition temperature (Tg) that is measured is 204° C. (beginning of the glass transition).

The measurement of the stress at the flow threshold was carried out on a (2/M)-type pulling machine of the MTS Company that is equipped with an inverter device to make said machine operate in the compression mode. This machine comprises a measuring head of 10 kiloNewton (kN) and a crosspiece that operates at a speed of 1 millimeter/minute (mm/min). The measurements are carried out on five samples that each have the shape of a straight prism according to Standard ISO 844. The mean value of the stress at the flow threshold is 12 MPa for the alveolar material that is obtained above and that has a density of 0.4.

The insulating properties of the foam have been determined by the measurement of the thermal conductivity according to Standard ASTM C518, with a RAPID-K apparatus of the Dynatec Technology Company. The measured thermal conductivity is 0.091 watt/meter.Kelvin (W/m.K) for the alveolar material that is obtained above and that has a density of 0.4.

EXAMPLE 6

The different stages of Example 5 are reproduced identically but by using paratoluenesulfonyl-semicarbazide as a chemical pore-forming agent, whereby the chemical decomposition temperature of said pore-forming agent is 230° C. 90 g of this composition is introduced into a mold of 255 cm$^3$. The mold is closed hermetically, then brought to 240° C. for 2 hours. Annealing is then initiated by bringing the mold to 260° C. for two hours. After cooling and opening the mold, a plate of alveolar material of a density that is equal to 0.4 is recovered. The glass transition temperature, the thermal conductivity and the stress at the flow threshold are identical to those that are found on the foam material that is obtained according to Example 5.

The preceding examples can be repeated with similar results by substitution the reagents and/or the general or special conditions that are describe in the invention with those that are used in these examples.

In addition, the preceding specific embodiments should be considered as a simple illustration and not in any arbitrary way as a limitation of the remainder of the description.

Based on the preceding description, one skilled in the art can easily determine the essential characteristics of the invention and, without deviating from the spirit and the scope of the latter, providing it with various changes and modifications to adapt it to various uses and operating conditions.

What is claimed is:

1. An alveolar material comprising at least one thermostable, thermoplastic polymer, at least one epoxide resin modified by at least one aromatic polyamine and at least one pore-forming agent or the degradation product(s) of said pore-forming agent, said at least one aromatic polyamine comprising at least one alkyl substituent of 1–12 carbon atoms in the alpha position to one of the amino groups on the aromatic ring.

2. The alveolar material according to claim 1, wherein the thermostable, thermoplastic polymer comprises an amorphous, thermostable, thermoplastic polymer.

3. The alveolar material according to claim 1, wherein the thermostable, thermoplastic polymer is selected from the group that consists of polyetherimides, polyether sulfones and polyphenylene-sulfones.

4. The alveolar material according to claim 1, wherein the epoxide resin that is modified by at least one aromatic polyamine is formed from at least one polyepoxide that contains in its molecule at least 2 primary amino groups, whereby the molar ratio of the polyamine to the epoxide is such that each amino group corresponds to 1.6 to 2.6 epoxide groups.

5. The alveolar material according to claim 1, wherein the aromatic polyamine comprises at least two aromatic cores connected to one another by a linear or branched bivalent hydrocarbon radical that comprises 1 to 18 carbon atoms.

6. The alveolar material according to claim 1, wherein the content of thermoplastic polymer(s) is from about 15 to 98% by mass relative to the total mass of the thermoplastic polymer(s) and the epoxide resin, the content of epoxide resin that is modified by at least one aromatic polyamine is from about 2 to 85% by mass relative to the total mass of the thermoplastic polymer(s) and the epoxide resin, and the content of pore-forming agent or degradation product(s) of said pore-forming agent is from about 0.1 to about 5% by mass relative to the total mass of the alveolar material.

7. The alveolar material according to claim 1 containing at least one thermostable, thermoplastic polymer and at least one other polymer.

8. The alveolar material according to claim 7, wherein the other polymer is selected from the group consisting of polyetherketonates, arylene polysulfides, polycarbonates and thermoplastic elastomers.

9. The alveolar material according to claim 1, wherein it contains at least one additive that is selected from the group that consists of the active catalysts in the reaction between the epoxide resins and the occupied amines, antioxidants, pigments, adhesion promoters, heat stabilizers, radiation stabilizers, flame retardants, demolding agents, foam nucleation agents, dispersion agents, lubricants, dyes, plasticizers, flame-retarded products, bridging agents, surfactants, reinforcement agents, organic, mineral or organometallic reinforcing feedstocks, mineral or organic reinforcement fibers.

10. The alveolar material according to claim 1, wherein it contains organic or mineral feedstocks, hollow or less dense bodies that have participated in the creation of the pores of said material.

11. A process for the preparation of an alveolar material according to claim 1 comprising bringing into contact at least one thermostable, thermoplastic polymer, at least one epoxide resin that is modified by at least one aromatic polyamine, with at least one pore-forming agent, followed by the formation of said alveolar material under formation conditions of said alveolar material from said composition.

12. A composition comprising at least one thermostable, thermoplastic polymer, at least one epoxide resin modified by at least one aromatic polyamine and at least one pore-forming agent for the production of alveolar materials according to claim 1, said at least one aromatic amine comprising at least one alkyl substituent of 1–12 carbon atoms in the alpha position to one of the amino groups on the aromatic ring.

13. The alveolar material according to claim 1, wherein said at least one aromatic polyamine is selected from the group consisting of 3,5-diethyl-2,4-diaminotoluene, 3,5-diethyl-2,6-diaminotoluene and mixtures thereof.

14. The alveolar material according to claim 1, wherein said at least one aromatic polyamine is selected from the group consisting of 4,4'-Methylene-bis(2,6-dimethylaniline); 4,4'-methylene-bis(2-isopropyl-6-methylaniline); 4,4'-methylene-bis(2,6-diethylaniline); 4,4'-methylene-bis(2,6-diisopropylaniline); and 4,4'-methylene-bis(3-chloro-2,6-diethylaniline).

15. The alveolar material according to claim 1, wherein said at least one aromatic polyamine is selected from the group consisting of 4,4'-methylene-bis(2,6-diethylaniline) and 4,4'-methylene-bis(3-chloro-2,6-diethylaniline).

16. The alveolar material according to claim 1, wherein said at least one aromatic polyamine is selected from the group consisting of 4,4'-(phenylene-diisopropyl)-bis(2,6-dimethyl-aniline), 4,4'-(phenylene-diisopropyl)-bis(2,6-diethyl-aniline); 4,4'-(phenylene-diisopropyl)-bis(2,6-dipropyl-aniline); 4,4'-(phenylene-diisopropyl)-bis(2,6-diisopropyl-aniline); 4,4'-(phenylene-diisopropyl)-bis(2,6-dimethyl-3-chloro-aniline); 4,4'-(phenylene-diisopropyl)-bis(2,6-diethyl-3-chloro-aniline); 4,4'-(phenylene-diisopropyl)-bis(2,6-dipropyl-3-chloro-aniline); 4,4'-(phenylene-diisopropyl)-bis(2,6-diisopropyl-3-chloro-aniline); 3,3'-(phenylene-diisopropyl)-bis(2,6-dimethyl-aniline); 3,3'-(phenylene-diisopropyl)-bis(2,6-diethyl-aniline); 3,3'-(phenylene-diisopropyl)-bis(2,6-dipropyl-aniline); 3,3'-(phenylene-diisopropyl)-bis(2,6-dimethyl-3-chloro-aniline); 3,3'-(phenylene-diisopropyl)-bis(2,6-diethyl-3-chloro-aniline); 3,3'-(phenylene-diisopropyl)-bis(2,6-dipropyl-3-chloro-aniline); 3,3'-(phenylene-diisopropyl)-bis(2,6-diisopropyl-aniline); and 3,3'-(phenylene-diisopropyl)-bis(2,6-diisopropyl-3-chloro-aniline).

17. An article of manufacture comprising alveolar material according to claim 1 in molded form.

* * * * *